United States Patent Office 3,321,914
Patented May 30, 1967

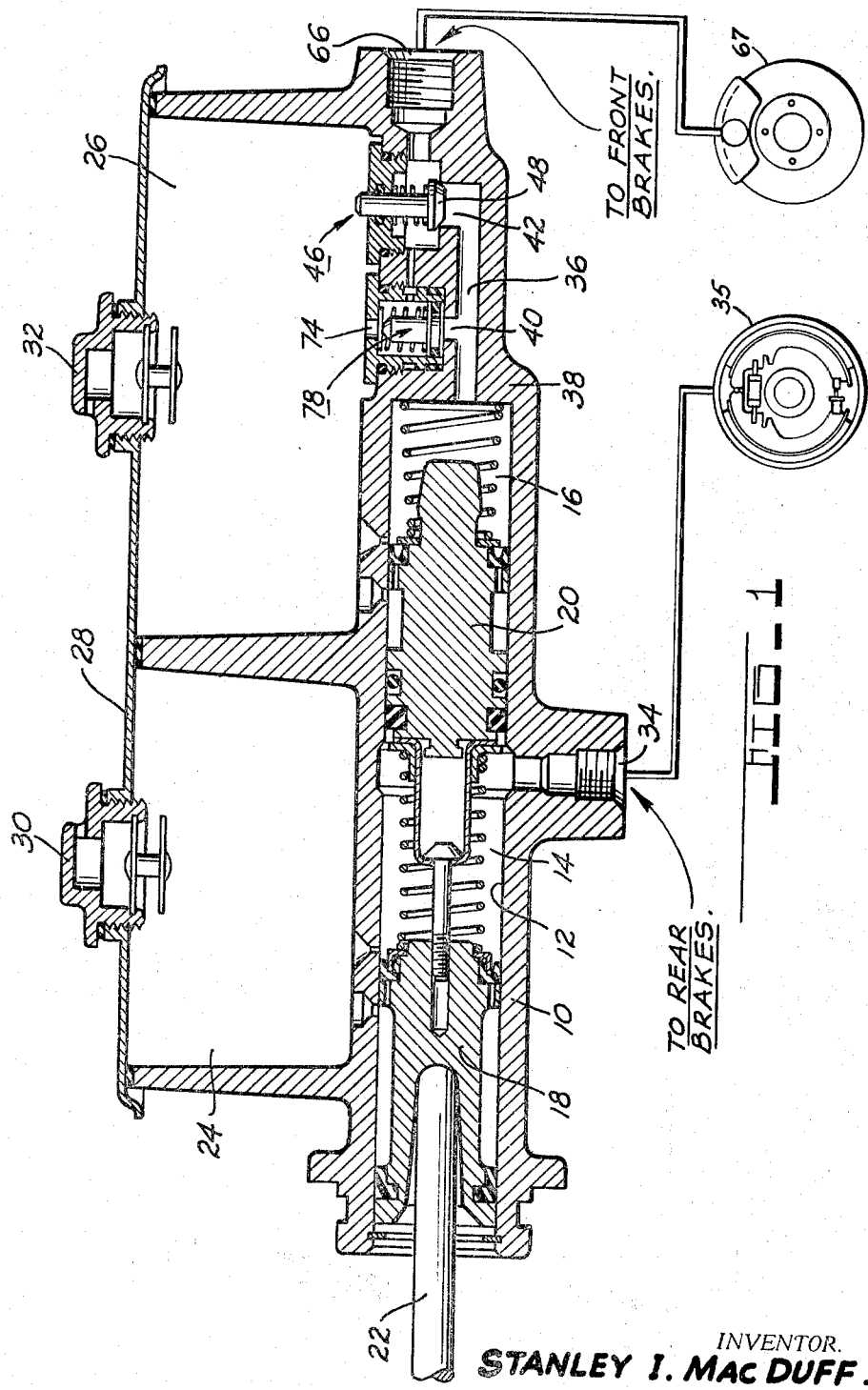

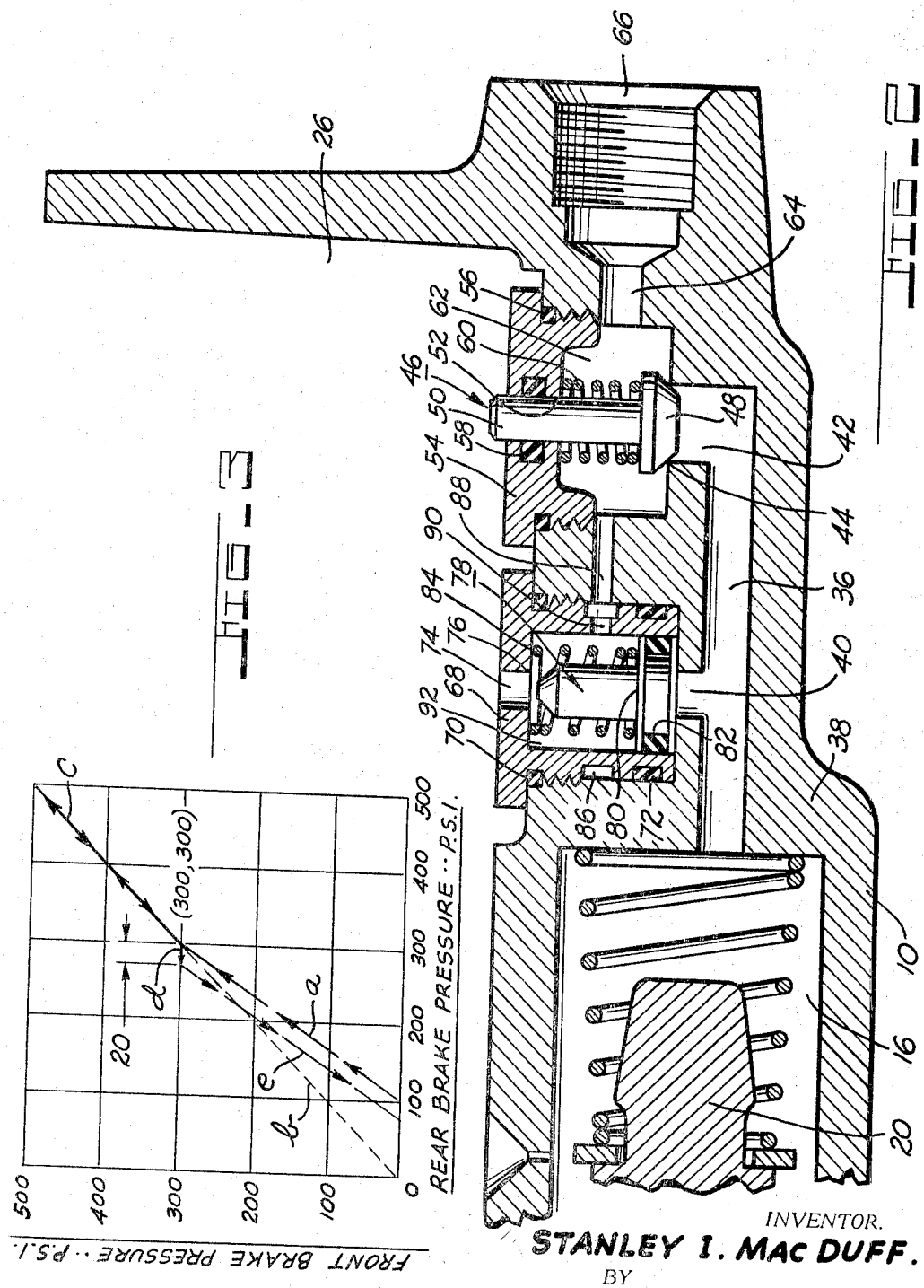

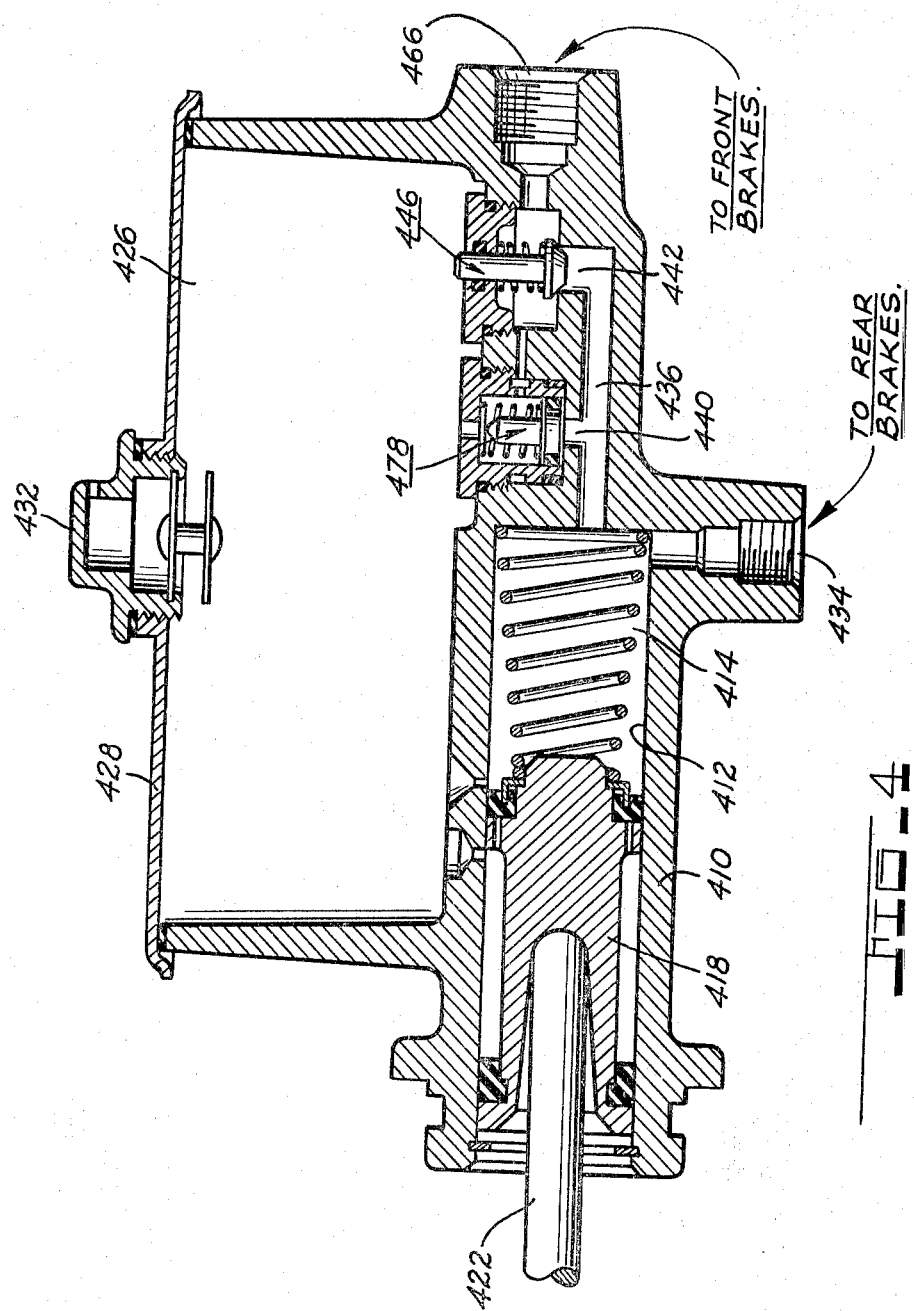

3,321,914
BRAKING SYSTEM FOR VEHICLES
Stanley I. MacDuff, South Bend, Ind., assignor to The Bendix Corporation, South Bend, Ind., a corporation of Delaware
Filed Apr. 19, 1965, Ser. No. 449,132
7 Claims. (Cl. 60—54.5)

This invention relates to a braking system for vehicles and more particularly to a master cylinder incorporating means for modifying the fluid pressure applied to the front brakes of the vehicle.

Many present day vehicles utilize braking systems having disc front brakes and drum rear brakes in order to obtain certain desired braking characteristics. In such arrangements the disc front brakes normally have no retracting springs and, in some instances, may even have springs urging the friction pads continuously into contact with the discs, whereas the drum rear brakes normally have full retracting springs which make it necessary to exert up to 100 p.s.i. in the actuating cylinder before contact can be established between the shoes and the brake drums. Consequently, with such an arrangement, any attempt to actuate the brakes by generating master cylinder pressures under 100 p.s.i. will only actuate the front brakes and result in certain undesirable consequences. For example; if the road is very slippery, the brake capability of the front brakes at 100 p.s.i., or less, may exceed the tractive capacity of the front wheels. This will produce at least two undesirable consequences. First of all, almost fifty percent of the vehicle weight carried by the rear wheels will not be providing any useful tractive capacity. Therefore, possible decelerations will be reduced almost fifty percent. Secondly, since the only effective braking will be occurring at the front wheels, steering capability may be lost because of overbraking these front wheels.

Accordingly, one of the objects of this invention is to provide a master cylinder for use in connection with disc front brakes and drum rear brakes which eliminates the foregoing undesirable features.

Another object of this invention is to provide a master cylinder for use in such a braking system which incorporates means for applying the front and rear brakes at substantially the same time.

More specifically, it is an object of this invention to provide a master cylinder for use in such a braking system which incorporates a pressure responsive valve in the front brake passage for permitting fluid flow from said master cylinder to said front brakes only at pressures above a predetermined value.

A further object of this invention is to provide a master cylinder for use in such a braking system, the operation of which is almost perfectly reversible.

The above and other objects and features of the invention will become apparent from the following description taken in connection with the accompanying drawings which form a part of this specification and in which:

FIGURE 1 is a longitudinal section of a split master cylinder incorporating the invention;

FIGURE 2 is an enlarged fragmentary section of the master cylinder shown in FIGURE 1 which shows the invention in a more detailed manner;

FIGURE 3 is a graph showing the relationship of front brake pressure to rear brake pressure provided by the master cylinder incorporating the invention; and FIGURE 4 is a view similar to that of FIGURE 1 which shows the invention incorporated into a simple master cylinder.

Referring to FIGURES 1 and 2 of the drawings, it will be seen that the master cylinder comprises a housing 10 having an elongated single diameter bore 12 divided into two chambers 14 and 16 by primary piston 18 and floating piston 20, respectively. Primary piston 18 is actuated by the usual foot pedal (not shown) and a push rod 22. The master cylinder housing also contains a rear brake reservoir 24 and a front brake reservoir 26 which are closed by a suitable cover 28 having fill and vent caps 30 and 32, respectively. Lateral passage 34 communicates chamber 14 with the drum rear brakes 35. A passage 36 extends through the end wall 38 of the housing 10 and is intercepted by two vertical stepped bores 40 and 42 extending downwardly from the bottom of the front brake reservoir 26. The shoulder 44 of stepped bore 42 forms a seat for a relief valve 46 which includes an enlarged head 48 resting upon said seat and a reduced diameter stem 50. The stem 50 projects into the reservoir 26 through a bore 52 formed in a plug 54 which is threaded into the upper end of the stepped bore 42. Plug 54 is sealed to the housing 10 by a rubber gasket 56 and valve stem 50 is sealed in the bore by an O-ring 58. A heavy spring 60, which is positioned in a chamber 62 formed by the enlarged portion of step bore 42 between the valve seat 44 and the plug 54, urges the relief valve against the seat 44 with a predetermined force. A passage 64 extends from chamber 62 and is provided with a threaded port 66 which is suitably connected to the disk front brakes 67.

A bushing 68 is threaded into the larger portion of stepped bore 40 and is sealed at the top and bottom, respectively, by rubber gaskets 70 and 72. The bushing 68 is formed with a stepped bore 74 the shoulder of which forms a seat 76 for a compensating valve 78. The valve 78 includes an enlarged portion 80 which has a sliding fit in the larger portion of the stepped bore 74 and is sealed therein by an O-ring 882. The lower face of the enlarged piston portion 80 of the valve 78 is exposed to the pressure in passage 36 through the smaller portion of the stepped bore 40. A spring 84 urges the valve 78 in a downward direction so that it is not normally in contact with the seat 76. Located on the periphery of bushing 68 is an annular groove 86 which communicates with chamber 62 through passage 88 and with chamber 92 through passage 90. When compensating valve 78 is not seated on valve seat 76, chamber 92 will be in unrestricted communication with the front brake reservoir 26.

FIGURE 3 is a graph of the relationship of front brake pressure to rear brake pressure provided by a master cylinder incorporating my invention when the valves are proportioned in the following predetermined manner: The head 48 of valve 46 has a seat area 44 three times the cross sectional area of the stem 50, and the piston portion 80 of valve 78 also has an area three times the area of the valve seat 76. Thus, if the seat area 44 of valve 46 is ¼ sq. in. and the area of stem 50 is ¹⁄₁₂ sq. in, the load of spring 60 should be 25 lbs. in order to provide initial valve opening at 100 p.s.i. It will be understood that by proper selection of the spring load and associated seat area, flow can be made to occur at any desired p.s.i.

The operation of the dual master cylinder will not be described in detail, but it will be understood that when a force is exerted through link 22 primary piston 18 is moved to the right thereby displacing fluid to the rear brakes through port 34 and increasing the pressure in chamber 14. The pressure in chamber 14 exerts a force on floating piston 20, thereby causing it to move to the right with a corresponding rise in the pressure in chamber 16. No fluid will be displaced to the front brakes, however, until the pressure in chamber 16 reaches 100 p.s.i. or enough to just raise valve 46 from its seat. As pressure is further increased in chamber 16 beyond the 100 p.s.i. point, fluid will flow past the valve 46 into the front brakes and raise the pressure therein along that portion of the curve of FIGURE 3 marked a. It should be understood that the pressure in chamber 16 is rising along the dash line marked $b$. When the pressure in chamber 16 reaches 300 p.s.i. it will be obvious that the pressure in port 66 likewise will have reached 300 p.s.i. At the 300 p.s.i. point, the pressure in chamber 62, which leads to the front brake port 66 and acts on the area of the stem 50 of the valve 46, is sufficient to overcome the load of the spring 60 and to hold the valve head 48 completely free of the seat 44. When this condition has been attained, it will be obvious that the fluid in chamber 16 is in free communication with port 66 and the pressures therein must be equal. Consequently, further pressure increases in chamber 14 will be reflected by equal pressure increases in chamber 16 and the relationship of pressures will extend along that portion of the curve marked $c$. If the force on push rod 22 is thereafter reduced, the pressures in chambers 14 and 16 will fall along the portion of the curve marked $c$ until the 300 p.s.i. point is reached. At this point, the head 48 of valve 46 will again be in contact with seat 44 and further return of fluid from port 66 via passage 36 to chamber 16 will be prevented. The relationship of pressures in chambers 14 and 16 and port 66 will now follow the horizontal line marked $d$. When the pressure in chamber 16 has fallen 20 p.s.i. below the pressure in port 66 and chamber 92, the valve 78 will move off of its seat 76 and will bleed fluid into the reservoir from the front brakes. As pressure is further reduced in chambers 14 and 16, the pressure in port 66 communicating with the front brakes will follow along that portion of the curve marked $e$. Thus, it will be seen that the rise and fall of pressures as a result of the operation of this master cylinder is almost perfectly reversible and it is felt that the slight break in the curve during the pressure reducing phase caused by the horizontal portion $d$ will not be felt by the driver and will not cause any difficulty in controlling the vehicle.

It will be obvious from the foregoing that the front brakes will be brought into operation simultaneously with the rear. Thus, even under extremely slippery conditions balanced rear and front braking will be obtained combined with higher or near maximum decelerations and minimum interferences with steering capability.

Although this invention is shown in FIGURES 1 and 2 as being incorporated in a form of split master cylinder, it is equally applicable to single master cylinders, as shown in FIGURE 4, and requires only that the ports for discharging fluid to the front and rear brakes be separated and that the valving constituting my invention be incorporated in the passage leading to the front brakes. The single master cylinder shown in FIGURE 4 will not be described in detail since the operation thereof will be essentially the same as that of a master cylinder already described. Furthermore, it will be noted that like parts are designated with like numerals plus 400.

The several practical advantages which flow from my novel inventive arrangement are believed to be obvious from the above description and other advantages may suggest themselves to those who are familiar with the art to which the invention relates.

Furthermore, although this invention has been described in connection with certain specific embodiments and pressures, it will be obvious to those skilled in the art that various changes may be made in the form, structure, and arrangement of parts and the desired pressures without departing from the spirit of the invention. Accordingly, I do not desire to be limited to the specific details disclosed herein primarily for purposes of illustration but, instead, desire protection falling within the scope of the appended claims.

Having thus described the various features of the invention, what I claim as new and desire to secure by Letters Patent is:

1. In a braking system for a vehicle having first and second set of brakes, a fluid pressure generating device comprising a housing having pressure chamber means therein and fluid reservoir means communicating with said chamber means, first passage means for communicating said chamber means with said first set of brakes, second passage means for communicating said chamber means with said second set of brakes, third passage means for communicating said first set of brakes with said reservoir means, movable piston means for generating pressure in said chamber means to displace fluid into said first and second sets of brakes, first pressure responsive valve means located in said first passage means for permitting fluid flow from said first passage means for permitting fluid flow from said chamber means to said first set of brakes only at chamber means pressures above a first predetermined value, and second pressure responsive valve means located in said third passage means for permitting fluid flow from said first set of brakes to said reservoir means only at chamber means pressures below a second predetermined value.

2. In a braking system for a vehicle having first and second sets of brakes, a fluid pressure generating device comprising a housing having a pressure chamber therein and a fluid reservoir communicating with said chamber, first passage means for communicating said chamber with said first set of brakes, second passage means for communicating said chamber with said second set of brakes, third passage means for communicating said first set of brakes with said reservoir, a movable piston member for generating pressure in said chamber to displace fluid into said first and second sets of brakes, first pressure responsive valve means located in said first passage means for permitting fluid flow from said chamber to said first set of brakes only at chamber pressures above a first predetermined value, and second pressure responsive valve means located in said third passage means for permitting fluid flow from said first set of brakes to said reservoir only at chamber pressures below a second predetermined value.

3. In a braking system for a vehicle having first and second sets of brakes, a fluid pressure generating device comprising a housing having first and second pressure chambers therein and fluid reservoir means communicating with said chambers, first passage means for communicating said first chamber with said first set of brakes, second passage means for communicating said second chamber with said second set of brakes, third passage means for communicating said first set of brakes with said reservoir means, first and second movable members for generating pressures in said first and second chambers, respectively, to displace fluid into said first and second sets of brakes, means for applying a force to one of said movable members to cause actuation thereof, fluid in said system for transmitting such force from said one movable member to the other movable member to simultaneously cause actuation of both members, first pressure responsive valve means located in said first passage means for permitting fluid flow from said first chamber to said first set of brakes only at first chamber pressures above a first predetermined value, and second pressure responsive valve means located in said third passage means for permitting fluid flow from said first set of brakes to said reservoir means only at first chamber pressures below a second predetermined value.

4. In a braking system for a vehicle having first and second sets of brakes, a master cylinder comprising a housing having a bore therein and fluid reservoir means communicating with said bore, first and second movable piston members located in said bore for defining first and second fluid pressure chambers and for displacing fluid from said chambers to said brakes, first passage means for communicating said first chamber with said first set of brakes, second passage means for communicating said second chamber with said second set of brakes, third passage means for communicating said first set of brakes with said reservoir means, first pressure responsive valve means located in said first passage means for permitting fluid flow from said first chamber to said first set of brakes only at first fluid chamber pressures above a first predetermined value, and second pressure responsive value means located in said third passage means for permitting fluid flow from said first set of brakes to said reservoir means only at first fluid chamber pressures below a second predetermined value.

5. A system, as defined in claim 4, wherein said first and second sets of brakes are the front and rear sets, respectively.

6. A system, as defined in claim 5, wherein said front brakes are of the disc type and the rear brakes are of the drum type.

7. In a braking system for a vehicle having disc front brakes and drum rear brakes, a master cylinder comprising a housing having a bore therein and fluid reservoir means communicating with said bore, movable piston means located in said bore for defining fluid pressure chamber means and for displacing fluid from said chamber means to said brakes, first passage means for communicating said chamber means with said disc brakes, second passage means for communicating said chamber means with said drum brakes, third passage means for communicating said disc brakes with said reservoir means, a relief valve located in said first passage means for permitting fluid flow from said chamber means to said disc brakes only at chamber means pressures above a predetermined value, spring means for urging said relief valve towards a closed position, a compensating valve located in said third passage means for permitting fluid flow between said disc brakes and said reservoir means only at chamber means pressures below said predetermined value, and spring means for urging said compensating valve towards an open position.

References Cited

UNITED STATES PATENTS

| | | | |
|---|---|---|---|
| 1,621,912 | 3/1927 | Van Derwyk | 60—54.5 |
| 3,040,534 | 6/1962 | Hager | 60—54.6 |
| 3,210,942 | 10/1965 | Chouings | 60—54.6 |

MARTIN P. SCHWADRON, *Primary Examiner.*
ROBERT R. BUNEVICH, *Examiner.*